(12) United States Patent
Murakami

(10) Patent No.: US 10,651,640 B2
(45) Date of Patent: May 12, 2020

(54) GROMMET AND WIRE HARNESS USING THE SAME

(71) Applicant: YAZAKI CORPORATION, Minato-ku, Tokyo (JP)

(72) Inventor: Tomoyasu Murakami, Hiroshima (JP)

(73) Assignee: YAZAKI CORPORATION, Tokyo (JP)

( * ) Notice: Subject to any disclaimer, the term of this patent is extended or adjusted under 35 U.S.C. 154(b) by 616 days.

(21) Appl. No.: 14/810,527

(22) Filed: Jul. 28, 2015

(65) Prior Publication Data

US 2016/0036212 A1 Feb. 4, 2016

(30) Foreign Application Priority Data

Jul. 29, 2014 (JP) .................. 2014-153589

(51) Int. Cl.
*H02G 3/22* (2006.01)
*H02G 3/08* (2006.01)

(52) U.S. Cl.
CPC ............... *H02G 3/22* (2013.01); *H02G 3/083* (2013.01)

(58) Field of Classification Search
CPC ........... H02G 3/065; H02G 3/083; H02G 3/22
USPC ......................................................... 174/659
See application file for complete search history.

(56) References Cited

U.S. PATENT DOCUMENTS

| | | | | |
|---|---|---|---|---|
| 2,800,526 A | * | 7/1957 | Moorhead | ............... H02G 3/083 16/2.1 |
| 4,928,349 A | * | 5/1990 | Oikawa | ..................... F16L 5/02 16/2.1 |
| 4,928,439 A | * | 5/1990 | Ramos | ..................... B24B 9/148 409/104 |
| 4,959,509 A | * | 9/1990 | Takeuchi | ............... H02G 3/083 174/153 G |
| 6,680,437 B2 | * | 1/2004 | Sato | ..................... B60R 16/0222 16/2.1 |
| 6,927,457 B2 | * | 8/2005 | Huang | ..................... H01L 23/60 257/355 |
| 7,399,922 B2 | * | 7/2008 | Oga | ......................... F16L 3/26 174/135 |

(Continued)

FOREIGN PATENT DOCUMENTS

| | | |
|---|---|---|
| JP | 2006-320162 A | 11/2006 |
| JP | 2007-173139 A | 7/2007 |

(Continued)

OTHER PUBLICATIONS

Japanese Office Action dated Aug. 7, 2018 in a counterpart Japanese application.

*Primary Examiner* — Stanley Tso

(74) *Attorney, Agent, or Firm* — Metrolex IP Law Group, PLLC

(57) ABSTRACT

A grommet (1) including a body portion (3) dividing an inside and an outside of a mounting member, an electric wire insertion portion (7) extending from the body portion (3) toward the outside of the mounting member and configured to insert an electric wire, a seal portion (9) provided at an end of the electric wire insertion portion (7) to be in close contact with an outer circumference of the electric wire, and a protective portion (11) disposed on the electric wire insertion portion (7) and configured to extend along the electric wire insertion portion (7) and to cover an outer circumference of the electric wire exposed from the seal portion (9).

15 Claims, 6 Drawing Sheets

(56) References Cited

U.S. PATENT DOCUMENTS

| | | | |
|---|---|---|---|
| 7,434,814 B2* | 10/2008 | Kumakura | F16L 5/10 16/2.1 |
| 8,586,879 B2* | 11/2013 | Schadow | H01R 13/562 174/19 |
| 2007/0143956 A1 | 6/2007 | Kumakura et al. | |

FOREIGN PATENT DOCUMENTS

| JP | 2012-235640 A | 11/2012 |
|---|---|---|
| JP | 2013-226961 A | 11/2013 |

* cited by examiner

GROMMET AND WIRE HARNESS USING THE SAME

CROSS REFERENCE TO RELATED APPLICATIONS

This application claims the priority of Japanese Patent Application No. 2014-153589, filed on Jul. 29, 2014, the entire content of which are incorporated herein by reference.

BACKGROUND

Technical Field

The present invention relates to a grommet applied to vehicles and a wire harness using the grommet.

Related Art

There has been known that a grommet including a panel mounting portion as a body portion dividing an inside and an outside of a mounting member, an electric wire insertion portion extending from the panel mounting portion toward the outside of the mounting member and configured to insert an electric wire, and a thick portion provided on an end of the electric wire insertion portion as a seal portion to be in close contact with an outer circumference of the electric wire (see JP 2012-235640 A).

By forming the surface of the thick portion in the grommet which is in close contact with the outer circumference of the electric wire, to be a smooth surface, the outer circumferential surface of the electric wire can be pressed in a wide range and water sealing properties can be improved.

SUMMARY

In a grommet as described in JP 2012-235640 A, tape is wound on the outer circumference of an electric wire exposed from an end where a seal portion of an electric wire insertion portion is provided to protect the electric wire from interference with other components such as vehicle bodies and devices.

However, the work to wind tape on the outer circumference of an electric wire exposed from the grommet requires to do winding work a plurality of times, leading to lower mounting workability. Mounting workability further deteriorates when tape is wound while avoiding interference with jigs holding the grommet.

Thus, an object of the invention is to provide a grommet and a wire harness using the grommet capable of protecting an electric wire exposed from the grommet and improving mounting workability.

A grommet according to the first aspect of the present invention includes a body portion configured to divide an inside and an outside of a mounting member, an electric wire insertion portion extending from the body portion toward the outside of the mounting member and configured to insert an electric wire, a seal portion provided at an end of the electric wire insertion portion to be in close contact with an outer circumference of the electric wire, and a protective portion disposed on the electric wire insertion portion and configured to extend along the electric wire insertion portion and to cover an outer circumference of the electric wire exposed from the seal portion.

In the grommet, the protective portion is disposed on electric wire insertion portion and configured to extend along the electric wire insertion portion and to cover an outer circumference of the electric wire exposed from the seal portion, therefore there is no need to wind tape on the outer circumference of the electric wire exposed from the grommet so that mounting workability can be improved.

The protective portion only needs to be disposed to cover the outer circumference of the electric wire exposed from the seal portion and thus, the shape of the protective portion can be simplified and the manufacturing cost of the grommet can be reduced.

For such a grommet, therefore, there is no need to wind tape and the electric wire exposed from the grommet can be protected so that mounting workability can be improved.

The body portion may be provided with a plurality of the electric wire insertion portions, and the protective portions formed on each of the plurality of electric wire insertion portions may be provided with outside diameters set smaller than the outside diameter of the seal portion having a maximum diameter.

In the grommet, the outside diameter of the protective portions provided in each of the plurality of electric wire insertion portions is set smaller than the outside diameter of the seal portion having the maximum diameter. Accordingly, when the end side of the protective portion is inserted into the protective member, the insertion work into the protective member can be done easily and mounting workability can be further improved.

The protective portion may have the outside diameter on an opposite side of a seal portion side set smaller than the outside diameter on the seal portion side.

In the grommet, the protective portion has the outside diameter on the opposite side of the seal portion side set smaller than the outside diameter on the seal portion side and therefore the thickness on the opposite side of the seal portion side of the protective portion is set thinner than the thickness on the seal portion side.

Accordingly, stiffness on the opposite side of the seal portion side of the protective portion is lower than the seal portion side of the protective portion, diameter expansion work of the protective portion by jigs or the like can easily be done, and even if the protective portion is extended from the electric wire insertion portion, degradation in mounting workability can be controlled.

A wire harness according to the second aspect of the present invention includes the grommet according the first aspect of the present invention and a protective member. The protective member is disposed on the outer circumference of the electric wire exposing from the protective portion and an end side of the protective portion is inserted into the protective member.

In the wire harness, the end side of the protective portion is inserted into a protective member; therefore, there is no need to wind tape around the electric wire exposed between the electric wire insertion portion and the protective member so that mounting workability can be significantly improved.

A grommet or a wire harness including the grommet according to the first aspect and the second aspect of the present invention is capable of protecting an electric wire exposed from the grommet and improves mounting workability.

DETAILED DESCRIPTION

Figure 1:
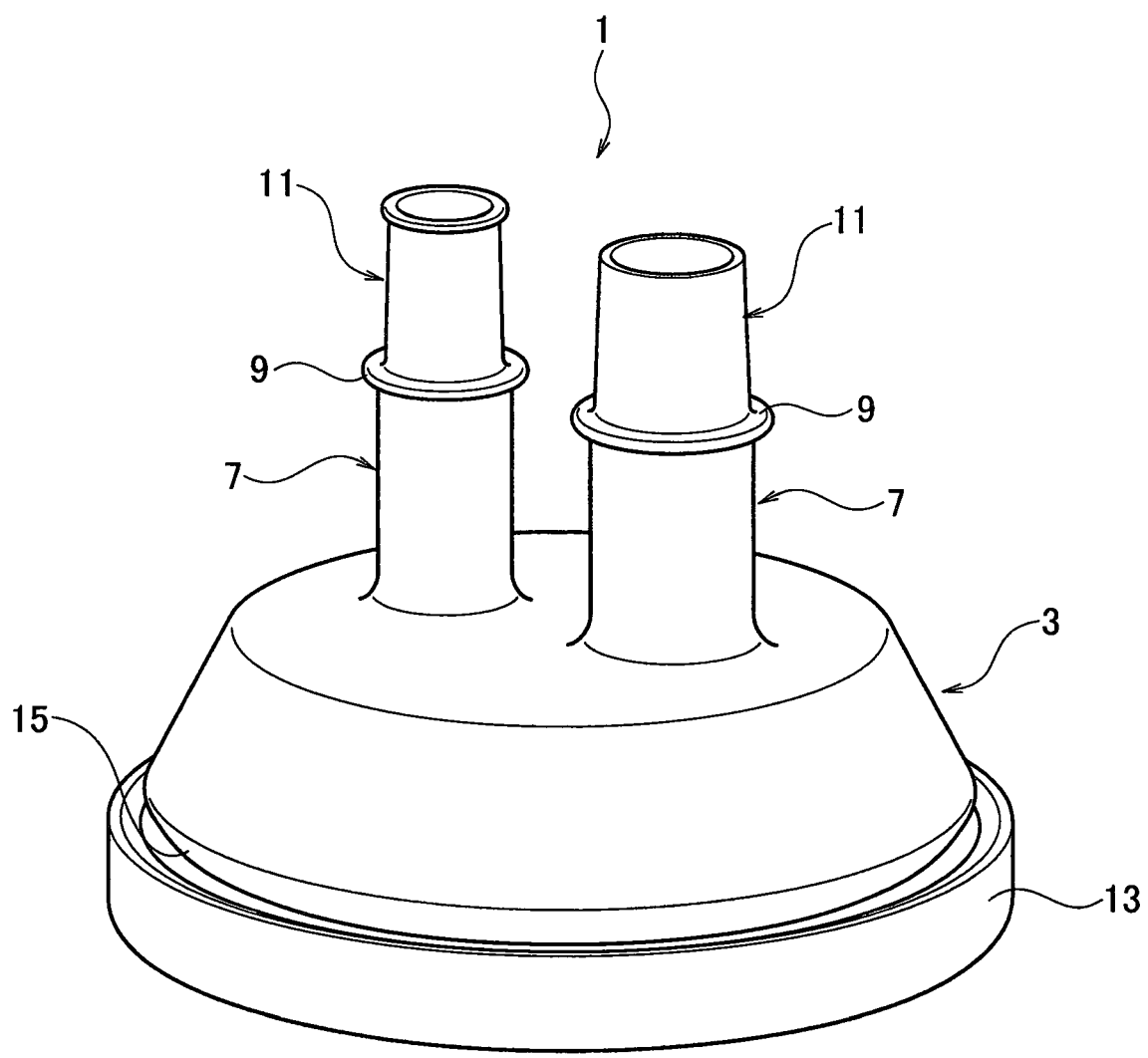
FIG. 1 is a perspective view of a grommet according to an embodiment of the present invention.

A grommet according to an embodiment of the present invention and a wire harness including such a grommet will be described based on FIGS. 1 to 6.

A grommet 1 according to the embodiment includes a body portion 3 configured to divide an inside and an outside of a mounting member (not shown), an electric wire insertion portion 7 extending from the body portion 3 toward the outside of the mounting member and configured to insert an electric wire 5, and a seal portion 9 provided on an end of the electric wire insertion portion 7 to be in close contact with an outer circumference of the electric wire 5.

Then, a protective portion 11 is disposed on the electric wire insertion portion 7 and is configured to extend along the electric wire insertion portion and to cover an outer circumference of the electric wire 5 exposed from the seal portion 9.

The body portion 3 is provided with a plurality of the electric wire insertion portions 7, 7. The protective portions 11, 11 provided in each of the plurality of electric wire insertion portions 7, 7 have an outside diameter set smaller than that of the seal portion 9 having the maximum diameter.

Further, the protective portion 11 has an outside diameter on the opposite side of the side of the seal portion 9 set smaller than that on the side of the seal portion 9.

A wire harness 101 including the grommet 1 has a protective member 21 disposed on the outer circumference of the electric wire 5 exposing from the protective portion 11 and the protective member 21 has an end side of the protective portion 11 inserted into the protective member.

The grommet 1 according to the embodiment has, for example, an electric wire in which the outer circumference of a core wire made of a stranded wire as the electric wire 5 is coated with an insulating material inserted therethrough. The electric wire 5 is cabled outside the cabin (water susceptible area). Incidentally, the electric wire 5 may be provided with one wire or a bundle of a plurality of wires.

The electric wire 5 cabled outside the cabin (water susceptible area) is led into the cabin (waterproof area) via the grommet 1 assembled into a mounting hole provided in a vehicle body frame or casing as a mounting member, and outside the cabin (water susceptible area) and inside the cabin (waterproof area) are divided by the grommet 1 for waterproofing. Hereinafter, the grommet 1 according to the embodiment and the wire harness 101 using the grommet 1 will be described in detail using FIGS. 1 to 4.

As shown in FIGS. 1 to 4, the grommet 1 includes the body portion 3, the electric wire insertion portion 7, the seal portion 9, and the protective portion 11.

The body portion 3 is made of an elastic material such as rubber, formed in a cylindrical shape, and assembled into a mounting hole (not shown) provided in a vehicle body frame or casing as a mounting member. The body portion 3 is provided with a rip portion 13 that divides the inside (waterproof area) and the outside (water susceptible area) of the mounting member and after coming into close contact with the wall surface of the mounting member continuously throughout the area in the circumferential direction.

A mounting portion 15 formed in a recess shape continuously throughout the area in the circumferential direction is provided in the vicinity of the rip portion 13 of the body portion 3. The grommet 1 is fixed to the mounting member by an edge portion of the mounting hole being fitted to the mounting portion 15. Incidentally, an inner member having a locking portion locked on the edge portion of the mounting hole may integrally be provided inside the body portion 3 so that the grommet 1 is fixed to the mounting member via the inner member.

By fitting the edge portion of the mounting hole to the mounting portion 15, the body portion 3 as described above is fixed to the mounting member so that the rip portion 13 is being brought into close contact with the wall surface of the mounting member. Then, the body portion 3 divides the inside (waterproof area) and the outside (water susceptible area) of the mounting member to make the inside of the mounting member (here, in the cabin: waterproof area) waterproof. The electric wire insertion portion 7 is provided in a central part of the body portion 3.

The electric wire insertion portion 7 is formed from a member continuing from the body portion 3 via a coupling portion 19 and extends in a cylindrical shape from the body portion 3 toward the outside of the mounting member (here, outside the cabin: water susceptible area).

The body portion 3 is provided with a plurality (two in this case) of the electric wire insertion portions 7, 7 in the center portion thereof. These two electric wire insertion portions 7, 7 have mutually different diameters and the electric wires 5, 5 having mutually different diameters are inserted therethrough respectively. The seal portion 9 is provided in each of the electric wire insertion portions 7, 7.

A plurality of the seal portions 9 is disposed in the length direction of the electric wire insertion portion 7 and has a projected rim formed continuously in the circumferential direction on an inner circumferential surface of the electric wire insertion portion 7. The inner circumferential surface of the seal portion 9 is in close contact with the outer circumferential surface of the electric wire 5 to be a waterproof state between the electric wire 5 and the electric wire insertion portion 7.

The seal portion 9 as described above is effective if provided on an end of the electric wire insertion portion 7. By being provided on an end of the electric wire insertion portion 7, the seal portion 9 can reliably prevent water and the like from penetrating into the electric wire insertion portion 7.

Thus, among the plurality of seal portions 9, the seal portion 9 in an outermost position of the electric wire insertion portion 7 has a projected rim formed continuously on the outer circumferential surface of the electric wire insertion portion 7 to ensure pressured contact between the inner circumferential surface of the seal portion 9 and the outer circumferential surface of the electric wire 5.

The electric wire 5 exposed to the outside from the electric wire insertion portion 7 having the seal portion 9 as described above on an end of the electric wire 5 is necessary to be protected from interference with other components such as the vehicle body and devices. Thus, the protective member 21 such as a corrugate tube is disposed on the outer circumference of the electric wire 5 exposed from the grommet 1. The protective member 21 described above and the grommet 1 is combined so as to provide the wire harness 101.

Incidentally, in a conventional wire harness, the electric wire 5 positioned between the electric wire insertion portion 7 of the grommet 1 and the protective member 21 is exposed to the outside. Thus, tape is conventionally wound around the electric wire 5 exposed from the electric wire insertion portion 7 and a tape winding portion and the protective member 21 are overlapped such that the tape winding portion is disposed inside the protective member 21 by a predetermined length.

However, in a wire harness in which the portion around which tape is wound is overlapped with the protective member 21, such a state is maintained by jigs and the like while shifting the position of the protective member 21 and it is also necessary to rewind the tape while avoiding interference with jigs and the like in a state in which the position of the body portion 3 of the grommet 1 is maintained by jigs or the like, leading to lower mounting workability.

In addition, the tape needs to be wound on the outer circumference of the electric wire 5 in such a way that the portion around which the tape is wound is disposed inside the protective member 21 by a predetermined length and thus, the control of the number of times of winding tape is complicated, leading to still lower mounting workability In the wire harness 101 according to the embodiment, therefore, the protective portion 11 is provided integrally with the electric wire insertion portion 7 on an end of the electric wire insertion portion 7 of the grommet 1.

The protective portion 11 extends in a tubular shape from an end where the seal portion 9 of the electric wire insertion portion 7 is provided toward the protective member 21 as a member continuing from the electric wire insertion portion 7 so as to be disposed inside the protective member 21 by a predetermined length. A material for the protective portion does not need to be the same material as that of the electric wire insertion portion 7 as long as the material can protect the outer circumference of the electric wire 5 and may be a different material from that of the electric wire insertion portion 7.

The protective portion 11 is disposed so as to cover the outer circumference of the electric wire 5 exposed from the seal portion 9 in the outermost position of the electric wire insertion portion 7 and is also disposed by overlapping with the protective member 21 so that an end side thereof is disposed inside the protective member 21 by a predetermined length.

By integrally providing the protective portion 11 on an end of the electric wire insertion portion 7 as described above, there is no need to wind tape around the electric wire 5 positioned between the electric wire insertion portion 7 and protective member 21 and mounting workability can be significantly improved.

Even when the tape is wound around the electric wire 5 exposed from the electric wire insertion portion 7 of the grommet 1 without disposing the protective member 21, with the protective portion 11 provided, there is no need to wind tape while avoiding interference with jigs and the like maintaining the body portion 3 of the grommet 1 so that mounting workability can be significantly improved, as compared to the case of winding a tape. In addition, the number of times of winding tape can be reduced so that mounting workability can further be improved.

Figure 2:
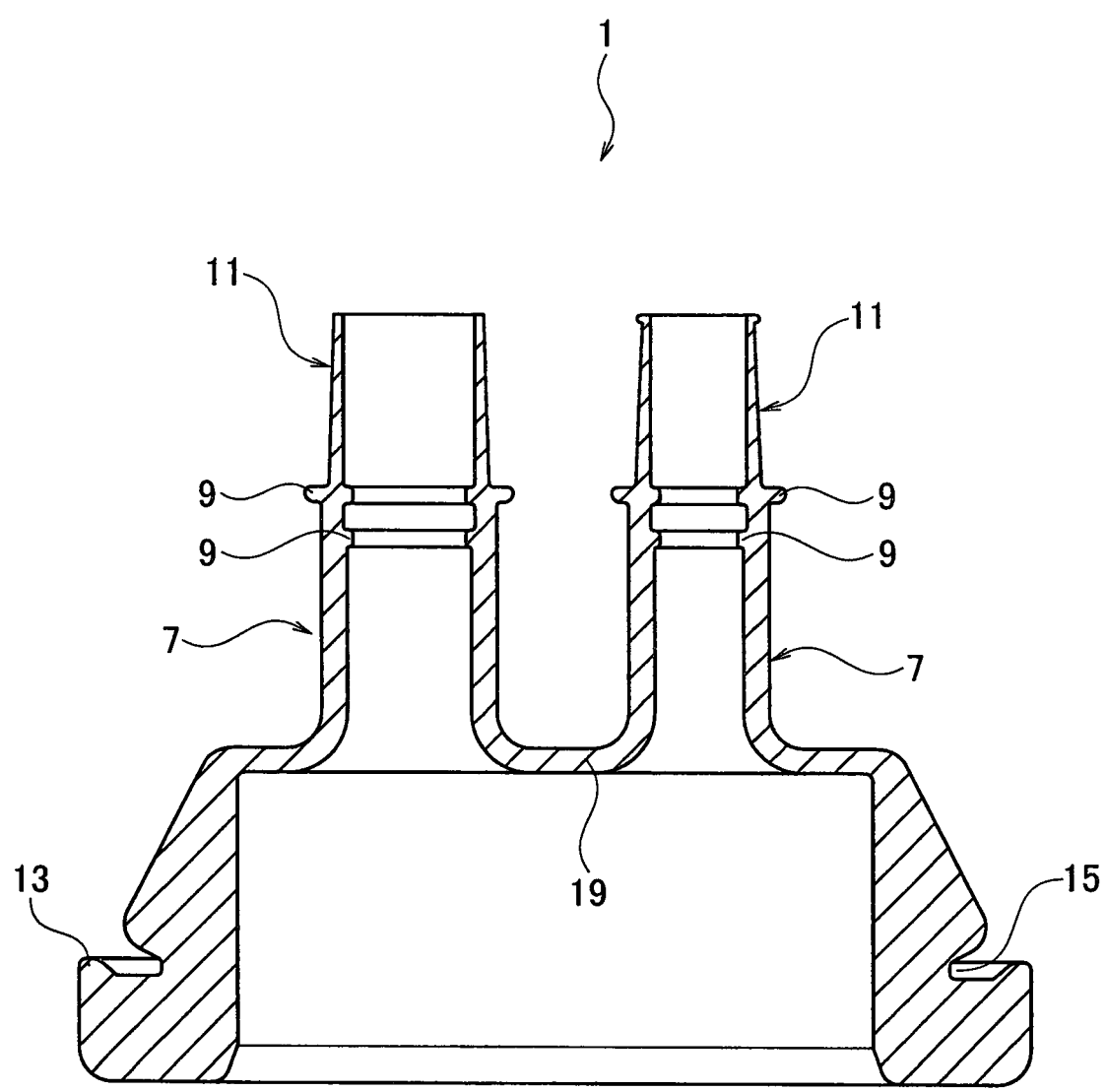
FIG. 2 is a cross-sectional view of the grommet according to an embodiment of the present invention.
Figure 3:
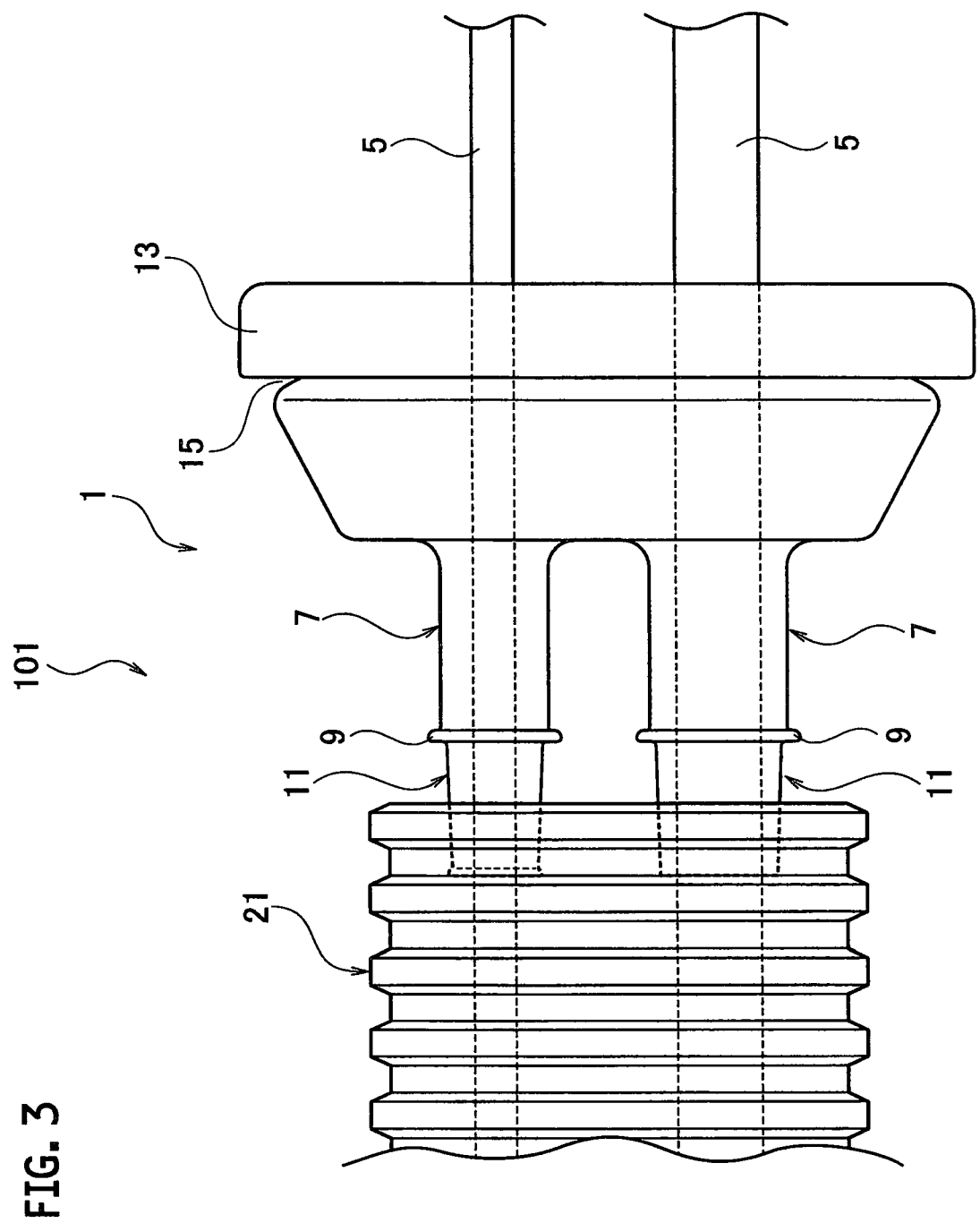
FIG. 3 is a side view of a wire harness according to an embodiment of the present invention.
Figure 4:
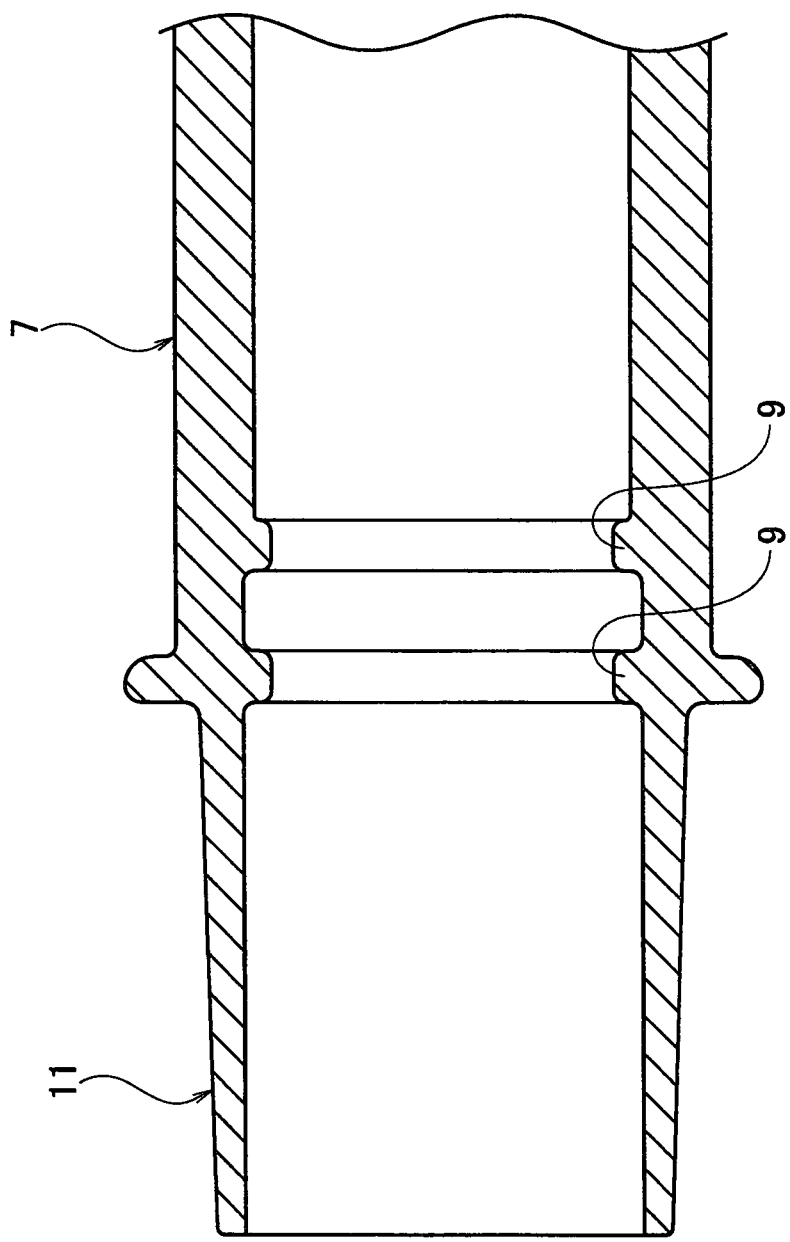
FIG. 4 is a relevant portion enlarged sectional view of the grommet according to an embodiment of the present invention.

On the other hand, the outside diameter of each of the plurality of protective portions 11, 11 is set smaller than the outside diameter of the seal portion 9 having the maximum diameter (here, the seal portion 9 provided in the electric wire insertion portion 7 on the left side in FIG. 2) provided in the plurality of electric wire insertion portions 7, 7 respectively.

For a wire harness in which the protective portion 11 is not provided, when tape is wound around the electric wire 5 exposed from the electric wire insertion portion 7, it is necessary to wind tape also on the outer circumference on the end side of the electric wire insertion portion 7.

When tape is wound on the outer circumference of the electric wire insertion portion 7, the outer circumference of the tape winding portion covering the outer circumference of the electric wire 5 may become larger than that of the electric wire insertion portion 7. That is, there is a possibility that it may become difficult to insert the end side of the tape winding portion into the protective member 21.

In the wire harness 101, the outside diameter of the protective portions 11, 11 is set smaller than the outside diameter of the seal portion 9 having the maximum diameter, that is, the electric wire insertion portion 7 of the maximum diameter; therefore, the insertion work of the end side of the protective portions 11, 11 into the protective member 21 can be done easily.

In addition, even when the tape is wound around the electric wire 5 exposed from the electric wire insertion portion 7 of the grommet 1 without disposing the protective member 21, the outside diameter of the tape winding portion will not become larger and length of the tape can be reduced.

Because the outside diameter of the protective portions 11, 11 only needs to be set smaller than the outside diameter of the seal portion 9 having the maximum diameter, for example, the outside diameter of the protective portions 11, 11 may be set larger than the outside diameter of the seal portion 9 having the minimum diameter (here, the seal portion 9 provided in the electric wire insertion portion 7 on the right side in FIG. 2).

Even if the outside diameter of the protective portions 11, 11 is set as described above, the outside diameter of the protective portions 11, 11 will not become larger than that of the seal portion 9 having the maximum diameter so that the insertion work of the end side of the protective portions 11, 11 into the protective member 21 can be done easily.

On the other hand, the protective portion 11 is formed in a taper form in which the outside diameter of the protective portion 11 decreases from the seal portion 9 side (the electric wire insertion portion 7 side) toward the opposite side (end side) so that the outside diameter on the opposite side of the seal portion 9 side becomes smaller than the outside diameter on the seal portion 9 side.

By forming the protective portion 11 as described above, the thickness of the protective portion 11 on the opposite side of the seal portion 9 side is formed thinner than the thickness of the protective portion 11 on the seal portion 9 side so that stiffness of the protective portion 11 on the opposite side of the seal portion 9 side is lower than on the seal portion 9 side.

Therefore, even when the protective portion 11 is extended from the electric wire insertion portion 7, a large force is not required for expanding the diameter of the electric wire insertion portion 7 and the protective portion 11 by a jig or the like. Consequently, degradation in mounting workability can be controlled.

Incidentally, the protective portion 11 having a small diameter is provided with a projected rim on the outside diameter on an end thereof, but this is intended to prevent the end of the protective portion 11 from curling and when there is no need to provide the projected rim, the projected rim may not be provided.

In the grommet 1 as described above, the protective portion 11 disposed so as to cover the outer circumference of the electric wire 5 exposed from the seal portion 9 is extended from the electric wire insertion portion 7 and thus, there is no need to wind tape on the outer circumference of the electric wire 5 exposed from the grommet 1 so that mounting workability can be improved.

The protective portion 11 only needs to be disposed so as to cover the outer circumference of the electric wire 5 exposed from the seal portion 9 and thus, the shape of the protective portion 11 can be simplified and the manufacturing cost of the grommet 1 can be reduced.

In the grommet 1 as described above, therefore, there is no need to wind tape due to the protective portion 11 and the electric wire 5 exposed from the grommet 1 can be protected so that mounting workability can be improved.

The outside diameter of the protective portions 11, 11 provided in the plurality of electric wire insertion portions 7, 7 respectively is set smaller than that of the seal portion 9 having the maximum diameter provided in the plurality of electric wire insertion portions 7, 7 respectively and thus, when tape is wound on the outer circumference on the end side of the protective portions 11, 11, the length of the tape can be reduced.

In addition, when the end side of the protective portions 11, 11 is inserted into the protective member 21, the insertion work into the protective member 21 can be done easily so that mounting workability can further be improved.

Further, the protective portion 11 has the outside diameter on the opposite side of the seal portion 9 side set smaller than the outside diameter on the seal portion 9 side; therefore, the thickness on the opposite side of the seal portion 9 side of the protective portion 11 is set thinner than the thickness on the seal portion 9 side.

Therefore, stiffness on the opposite side of the seal portion 9 side of the protective portion 11 is lower than on the seal portion 9 side of the protective portion 11 and thus, it is easier to expand the diameter of the protective portion 11 using jigs or the like and even if the protective portion 11 is extended from the electric wire insertion portions 7, degradation in mounting workability can be controlled.

In the wire harness 101, the end side of the protective portion 11 is inserted into the protective member 21 and thus, there is no need to wind tape around the electric wire 5 exposed between the electric wire insertion portion 7 and protective member 21 so that mounting workability can be significantly improved.

Figure 5:
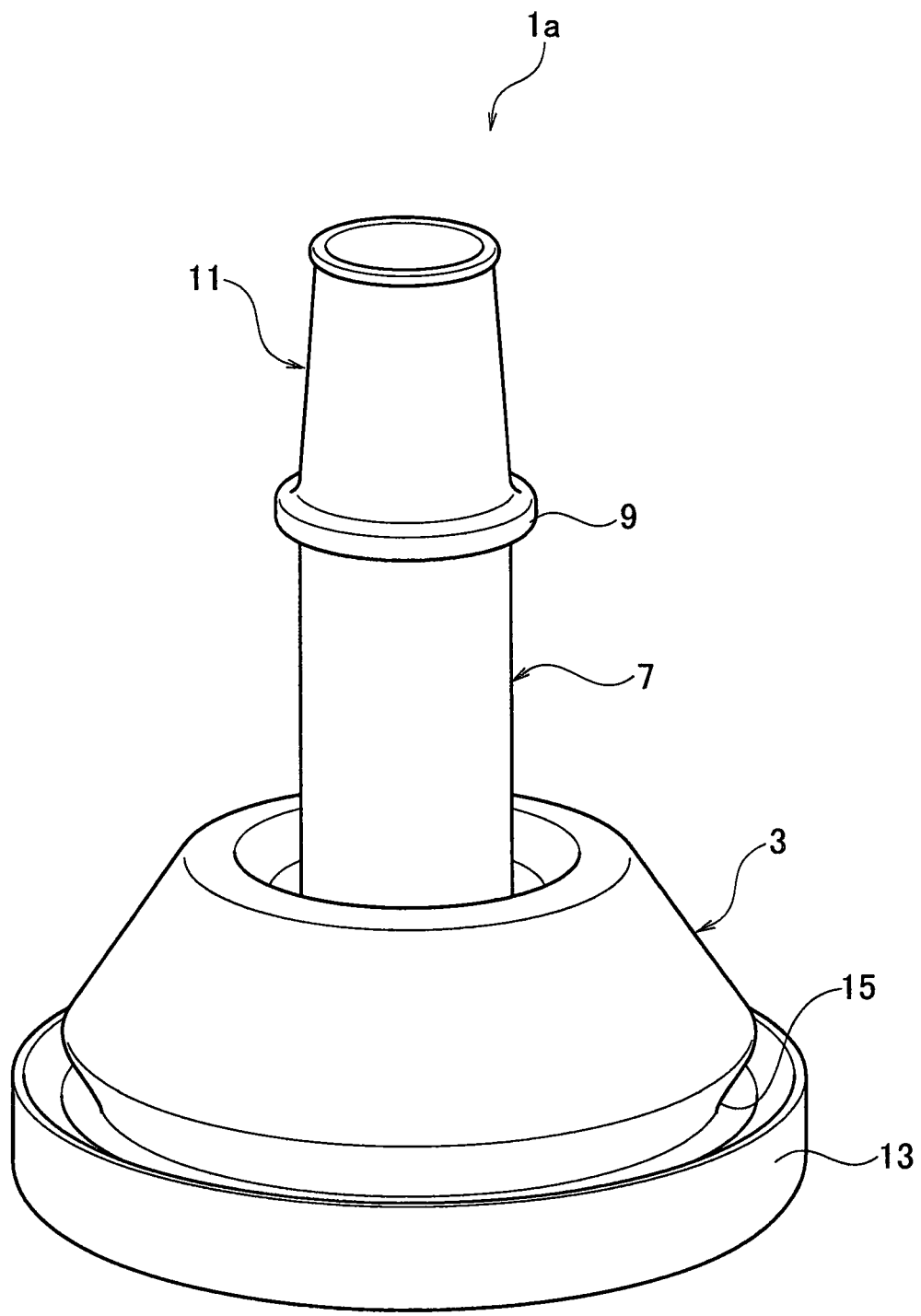
FIG. 5 is a perspective view of the grommet of another example according to an embodiment of the present invention.
Figure 6:
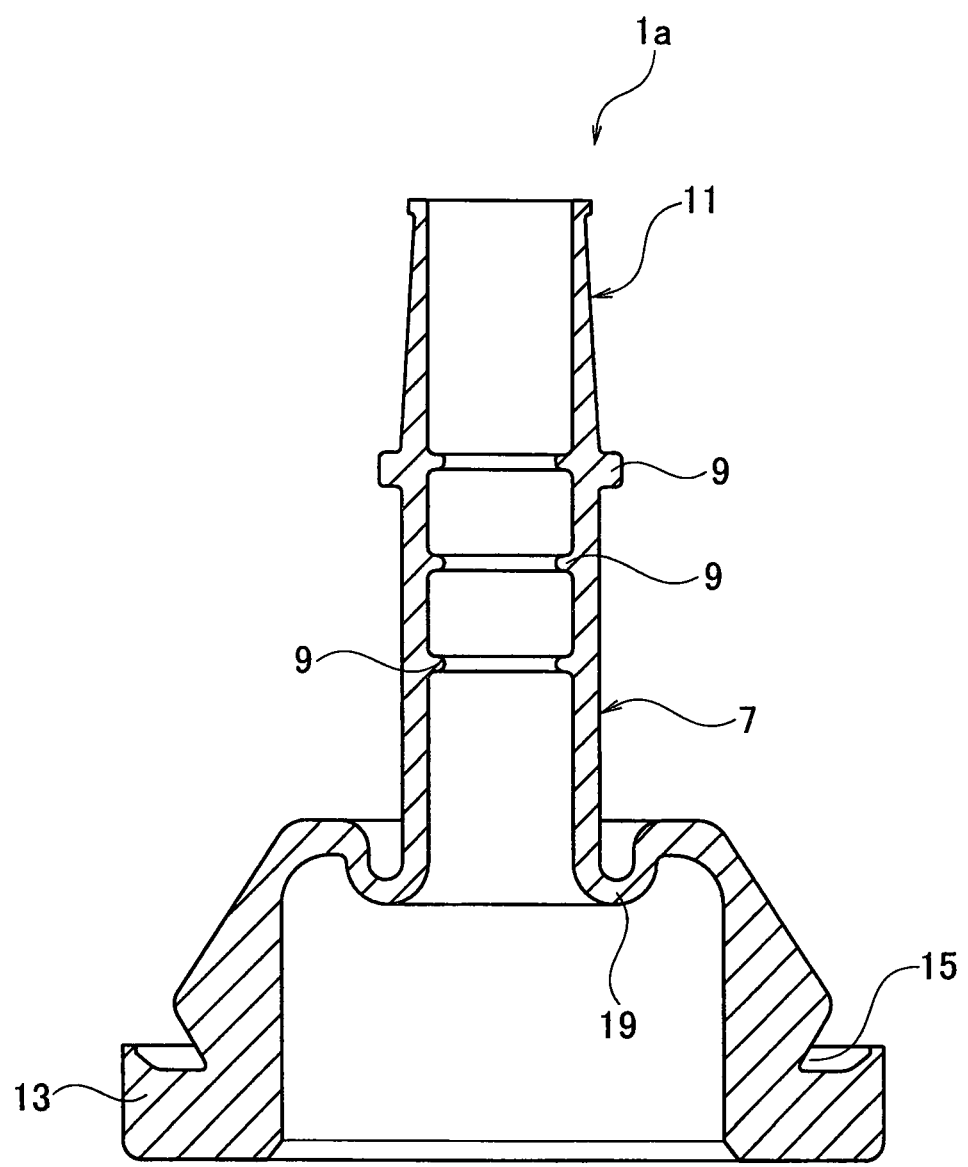
FIG. 6 is a cross-sectional view of the grommet of another example according to an embodiment of the present invention.

In the grommet 1 according to an embodiment of the present invention, the electric wire insertion portion 7 is provided at two places of the body portion 3, but the present invention is not limited to such a case and, like a grommet 1 a shown in FIGS. 5 and 6, the electric wire insertion portion 7 may be provided at one place of the body portion 3.

Even for the protective portion 11 provided on the electric wire insertion portion 7 of the grommet 1 a described above, there is no need to wind tape on the outer circumference of an electric wire exposed from the grommet 1 a so that mounting workability can be improved.

In the grommet according to an embodiment of the present invention, the seal portion provided in the electric wire insertion portion is provided on an end on the opposite side of the body portion side, but the present invention is not limited to such a case and the seal portion may be provided on the body portion side or over the entire area of the electric wire insertion portion.

The protective portion is provided in a taper shape so that the outside diameter on the opposite side of the seal portion side becomes smaller, but the present invention is not limited to such a case and the protective portion may be set to have the thickness thinner than that of the electric wire insertion portion and extended to have the uniform thickness in the length direction such that the outside diameter thereof is smaller than that of the electric wire insertion portion.

Further, the electric wire insertion portion is at two places or one place of the body portion, but the present invention is not limited to such a case and the electric wire insertion portion may be provided at two places or more.

What is claimed is:

1. A grommet comprising:
 a body portion configured to divide an inside and an outside of a mounting member;
 an electric wire insertion portion extending from the body portion toward the outside of the mounting member and configured to insert an electric wire;
 a seal portion provided at an outermost position of an end of the electric wire insertion portion to be in close contact with an outer circumference of the electric wire, wherein the seal portion comprises a projected rim formed continuously on the outer circumferential surface of the electric wire insertion portion to ensure pressured contact between the inner circumferential surface of the seal portion and the outer circumferential surface of the electric wire; and
 a protective portion disposed on the end of the electric wire insertion portion at the outermost position of the electric wire insertion portion where the seal portion is provided and configured to extend from the end of the electric wire insertion portion at the outermost position of the electric wire insertion portion away from the body portion along a length direction of the electric wire insertion portion and to cover an outer circumference of the electric wire exposed from the seal portion, wherein
 the protective portion has the outside diameter on an opposite side of a seal portion side set smaller than the outside diameter on the seal portion side,
 the protective portion has a wall thickness that continually decreases from the seal portion side to the opposite side of the seal portion side, and
 the electric wire insertion portion has a constant wall thickness that is greater than the wall thickness of the protective portion anywhere from the seal portion side to the opposite side of the seal portion side.

2. The grommet according to claim 1,
 wherein the body portion is provided with a plurality of the electric wire insertion portions, and
 wherein the protective portions formed on each of the plurality of electric wire insertion portions are provided with outside diameters set smaller than the outside diameter of the seal portion having a maximum diameter.

3. A wire harness including the grommet according to claim 1,
 wherein a protective member is disposed on the outer circumference of the electric wire exposing from the protective portion and an end side of the protective portion is inserted into the protective member.

4. The wire harness according to claim 3, wherein the protective portion extends in a tubular shape from an end where the seal portion of the electric wire insertion portion is provided toward the protective member and continuing from the electric wire insertion portion so as to be disposed inside the protective member by a predetermined length.

5. The wire harness according to claim 4, wherein the protective portion is disposed so as to cover the outer circumference of the electric wire exposed from the seal portion in the outermost position of the electric wire insertion portion by overlapping with the protective member so that an end side thereof is disposed inside the protective member by a predetermined length.

6. The wire harness according to claim 4, wherein
the grommet comprises a plurality of the electric wire insertion portions,
each of the electric wire insertion portions comprises a plurality of the seal portions disposed in the length direction of the electric wire insertion portion, and
an outside diameter of each of the plurality of protective portions of the plurality of electric wire insertion portions is set smaller than the outside diameter of the respective one of the plurality of the seal portions having a maximum diameter.

7. The wire harness according to claim 4, wherein
the grommet comprises a plurality of the electric wire insertion portions,
each of the electric wire insertion portions comprises a plurality of the seal portions disposed in the length direction of the electric wire insertion portion, and
an outside diameter of each of the plurality of protective portions of the plurality of electric wire insertion portions is set larger than the outside diameter of the respective one of the plurality of the seal portions having a minimum diameter.

8. A grommet according to claim 1, wherein
the protective portion is formed in a tapered shape with the outside diameter decreased from the seal portion side toward the opposite side of the seal portion side so that the outside diameter on the opposite side of the seal portion side becomes smaller than the outside diameter on the seal portion side.

9. The grommet according to claim 1 wherein the body portion is made of an elastic material formed in a cylindrical shape.

10. The grommet according to claim 1 wherein
the inside of the mounting member comprises a waterproof area and the outside of the mounting member comprises a water susceptible area, and
the body portion comprises a rip portion that divides the waterproof area and the water susceptible area after coming into close contact with a wall surface of the mounting member continuously in a circumferential direction.

11. The grommet according to claim 10, further comprising a mounting portion disposed in a recess shape continuously in a circumferential direction in a vicinity of the rip portion of the body portion.

12. The grommet according to claim 1, wherein
the electric wire insertion portion comprises a continuing member continuing from the body portion via a coupling portion, and
the continuing member extends in a cylindrical shape from the body portion toward the outside of the mounting member.

13. The grommet according to claim 12, wherein
the body portion comprises a plurality of the electric wire insertion portions in a center portion thereof configured to insert a plurality of electric wires,
the plurality of the electric wire insertion portions have mutually different diameters, and
the plurality of electric wires have mutually different diameters configured to be inserted into the plurality of electric wire insertion portions.

14. The grommet according to claim 1, wherein the electric wire insertion portion comprises a plurality of the seal portions disposed in the length direction of the electric wire insertion portion.

15. The grommet according to claim 1, wherein the protective portion is integral with the electric wire insertion portion on an end of the electric wire insertion portion.

* * * * *